(12) United States Patent
Laskin et al.

(10) Patent No.: US 9,946,066 B1
(45) Date of Patent: Apr. 17, 2018

(54) OPTICS FOR DIFFRACTION LIMITED FOCUSING INSIDE TRANSPARENT MEDIA

(71) Applicant: AdlOptica Optical Systems GmbH, Berlin (DE)

(72) Inventors: Alexander Laskin, Berlin (DE); Vadim Laskin, Berlin (DE)

(73) Assignee: ADLOPTICA OPTICAL SYSTEMS GMBH, Berlin (DE)

( * ) Notice: Subject to any disclaimer, the term of this patent is extended or adjusted under 35 U.S.C. 154(b) by 0 days.

(21) Appl. No.: 15/411,551

(22) Filed: Jan. 20, 2017

(51) Int. Cl.
G02B 27/00 (2006.01)
G02B 7/04 (2006.01)
(Continued)

(52) U.S. Cl.
CPC .......... G02B 27/0068 (2013.01); G02B 7/04 (2013.01); G02B 21/02 (2013.01); G02B 21/08 (2013.01);
(Continued)

(58) Field of Classification Search
CPC ...... G02B 27/0068; G02B 7/04; G02B 21/02; G02B 21/08; G02B 21/33; G02B 27/0012
(Continued)

(56) References Cited

U.S. PATENT DOCUMENTS 4,037,934 A * 7/1977 Matsubara ............. G02B 21/02
359/659
4,563,060 A * 1/1986 Yamagishi ............. G02B 21/02
359/658

(Continued)

FOREIGN PATENT DOCUMENTS

DE 102010039746 A1 1/2012

OTHER PUBLICATIONS

Wassermann et al., "On the Theory of Aplanatic Aspheric Systems", Proc. Phys. Soc. B, vol. 62, No. 2, pp. 2-8, 1949, downloaded from www.iopscience.iop.org (IP address 151.207.250.61) on Jun. 12, 2017 at 22:06.*

(Continued)

Primary Examiner — Frank Font
(74) Attorney, Agent, or Firm — Brian S. Steinberger; Law Offices of Brian S. Steinberger, P.A.

(57) ABSTRACT

Apparatuses, devices and systems and methods for microscopy and optical data storage in transparent media, as well as for laser material processing of transparent or semi-transparent materials. Optics for diffraction limited focusing inside transparent or semi-transparent media comprising aplanatic focusing optical system and positive meniscus lens where reciprocal positions of the components and a transparent medium are optimized with criterion of minimized aberration providing diffraction limited internal focusing at a given depth inside the said transparent medium. For modern high resolution microscopy the optical components have achromatic and apochromatic optical designs. Immersion in space between the meniscus lens and the transparent material is used to increase the system numerical aperture. Simultaneous compensation of aberrations at different depths in a transparent medium provides diffraction limited focusing in wide depth range and simultaneous operation in multiple working planes separated along optical axis that is required in modern multi-focus microscopy. For modern scientific and industrial applications the movable optical components can be motorized.

19 Claims, 7 Drawing Sheets

(51) Int. Cl.
 *G02B 21/02* (2006.01)
 *G02B 21/08* (2006.01)
 *G02B 21/33* (2006.01)

(52) U.S. Cl.
 CPC ......... *G02B 21/33* (2013.01); *G02B 27/0012* (2013.01)

(58) Field of Classification Search
 USPC .................. 359/379, 382, 383, 656–661
 See application file for complete search history.

(56) References Cited

U.S. PATENT DOCUMENTS

| | | | | |
|---|---|---|---|---|
| 4,880,298 | A | * | 11/1989 | Takada ................. G02B 3/0087 359/654 |
| 5,530,590 | A | * | 6/1996 | Saito ...................... G02B 21/02 359/657 |
| 5,805,346 | A | * | 9/1998 | Tomimatsu ............ G02B 21/02 359/656 |
| 5,940,220 | A | | 8/1999 | Suenaga et al. |
| 6,016,226 | A | * | 1/2000 | Arisawa ................. G02B 21/02 359/661 |
| 6,064,529 | A | | 5/2000 | McDonald et al. |
| 6,563,634 | B2 | | 5/2003 | Shimada et al. |
| 6,721,259 | B1 | | 4/2004 | Yamamoto et al. |
| 7,046,451 | B2 | * | 5/2006 | Mandai .................. G02B 21/02 359/656 |
| 7,065,013 | B2 | | 6/2006 | Yasuda et al. |
| 7,177,101 | B2 | | 2/2007 | Tanaka et al. |
| 7,199,938 | B2 | * | 4/2007 | Fujimoto ............... G02B 21/02 359/656 |
| 7,602,561 | B2 | | 10/2009 | Tanaka et al. |
| 7,903,528 | B2 | | 3/2011 | Kimura et al. |
| 8,526,091 | B2 | | 9/2013 | Ito et al. |
| 8,629,413 | B2 | | 1/2014 | Betzig et al. |
| 8,659,824 | B2 | | 2/2014 | Kato et al. |
| 8,659,827 | B2 | | 2/2014 | Redford |
| 8,705,178 | B2 | | 4/2014 | Fujita |
| 9,195,041 | B2 | | 11/2015 | Redford |
| 2002/0024744 | A1 | * | 2/2002 | Kasahara ............... G02B 21/02 359/656 |
| 2006/0203354 | A1 | * | 9/2006 | Fujimoto ............... G02B 21/02 359/660 |
| 2010/0165474 | A1 | * | 7/2010 | Yonetani ................ G02B 21/02 359/661 |
| 2014/0247502 | A1 | * | 9/2014 | Bauer .................... G02B 21/02 359/656 |
| 2015/0185474 | A1 | | 7/2015 | Goldberg et al. |

OTHER PUBLICATIONS

S. Hell et al., "Aberrations in confocal fluorescence microscopy induced by mismatches in refractive index," Journal of Microscopy 169(3), (1993), 15 pages.
R. Simmonds et al., "Three dimensional laser microfabrication in diamond using a dual adaptive optics system," Optics Express 19(24), (2011), 7 pages.
H. Itoh et al., "Spherical aberration correction suitable for a wavefront controller," Optics Express 17(16), (2009), 7 pages.
M. Booth et al., "Adaptive aberration correction in a confocal microscope," PNAS 99(9), 5788-5792 (2002).
Modern Optical Engineering, Smith, W.J., McGraw-Hill, New York, (2000), pp. 5, 6, 402-404 and 449.
Principles of Optics, Born, M. and Wolf, E., 7th edn., Cambridge University Press, Cambridge, (1999), pp. 159, 160 and 528.
S. Abrahamsson et al., "MultiFocus Polarization Microscope (MF-PolScope) for 3D polarization imaging of up to 25 focal planes simultaneously," Opt. Express 23(6), (2015), 21 pages.
N. Huot et al., "Analysis of the effects of spherical aberration on ultrafast laser-induced refractive index variation in glass," Opt. Express 15(19), (2007), 14 pages.
J. Zhang et al., "Seemingly Unlimited Lifetime Data Storage in Nanostructured Glass," Phys Rev Lett, 112(3), (2014), 6 pages.
E. Glezer et al., "Three-dimensional optical storage inside transparent materials," Opt Lett 21(24), (1996), 3 pages.
M. Beresna et al., "Radially polarized optical vortex converter created by femtosecond laser nanostructuring of glass," Appl Phys Lett, 98, (2011), 3 pages.

* cited by examiner

*Residual wave aberrations at different focusing depths in optimized optical system of Embodiment 1, Table 1*

| depth $s'_3$, mm | ds, mm | Wave aberration | RMS, waves |
|---|---|---|---|
| 0 | -0.019 | | 0.023 |
| 0.1 | 0.183 | | 0.016 |
| 0.2 | 0.387 | | 0.002 |
| 0.3 | 0.593 | | 0.024 |
| 0.4 | 0.802 | | 0.058 |

*FIG. 4*

Residual wave aberrations in optical system optimized
for wide range of focusing depths of Embodiment 2, Table 2

| depth $s'_3$, mm | ds, mm | $t_2$, mm | Wave aberration | RMS, waves |
|---|---|---|---|---|
| 0 | -0.252 | 7.127 | | 0.010 |
| 0.2 | 0.306 | 7.143 | | 0.008 |
| 0.4 | 0.809 | 7.144 | | 0.008 |
| 0.6 | 1.271 | 7.134 | | 0.017 |
| 0.8 | 1.705 | 7.116 | | 0.023 |
| 1.0 | 2.112 | 7.091 | | 0.043 |

*FIG. 5*

OPTICS FOR DIFFRACTION LIMITED FOCUSING INSIDE TRANSPARENT MEDIA

FIELD OF INVENTION

The present invention relates to the field of optics, and more particular to apparatuses, devices and systems and methods for microscopy and optical data storage in transparent media, as well as for laser material processing of transparent or semi-transparent materials.

BACKGROUND TO THE INVENTION

The task of diffraction limited light focusing inside transparent or semi-transparent media is important in techniques presuming a use of high numerical aperture (NA) objectives, for example, various types of microscopy including confocal microscopy (S. Hell et al., "Aberrations in confocal fluorescence microscopy induced by mismatches in refractive index," *Journal of Microscopy* 169(3), 1993), multi-focus microscopy (S. Abrahamsson et al., "MultiFocus Polarization Microscope (MF-PolScope) for 3D polarization imaging of up to 25 focal planes simultaneously," *Opt. Express* 23, 2015).

Other applications examples are cutting or drilling of glass, sapphire and other brittle materials using ultrafast lasers, laser-induced refractive index variation of glass (N. Huot et al., "Analysis of the effects of spherical aberration on ultrafast laser-induced refractive index variation in glass," *Opt. Express* 15, 2007), nanostructuring in glass for optical data storage (J. Zhang et al., "Seemingly Unlimited Lifetime Data Storage in Nanostructured Glass," *Phys Rev Lett* 112(3), 2014, and E. Glezer et al., "Three-dimensional optical storage inside transparent materials," *Opt Lett* 21, 1996), polarization converters (M. Beresna et al., "Radially polarized optical vortex converter created by femtosecond laser nanostructuring of glass," *Appl Phys Lett*, 98, 2011), holographic and other optical data storage techniques.

All of these microscopy, optical data storage and material processing techniques imply light beam focusing in transparent media in small spots, with the size of few micrometers being close to a wavelength value. A common feature of these techniques is using high-NA objectives which aberration correction is provided for a particular working plane in air or inside a transparent medium, for example on back surface of a cover slide; by diffraction limited focusing a spot size in the pre-determined working plane is defined by wave nature of light, i.e. by diffraction limitation.

When focusing at other than pre-determined depths inside the bulk medium there appears longitudinal spherical aberration, and resulting spot size is defined rather by this geometrical aberration—for numerical aperture more than NA0.4 the resulting focused spot can become several times larger than the diffraction limited one.

FIG. 1 illustrates appearing of spherical aberration by focusing the light inside a transparent medium, for example glass, having a flat boundary surface separating the said medium and air. Beam of light 1 propagating from air into the transparent medium 4 is focused in virtual point F' being located at depth $s_0$ inside the transparent medium. Paraxial focus F'' of the beam after refraction on the boundary flat surface locates at depth $s_0'$ from that surface. Refraction of a ray on optical surface obeys the well-known Snell's law (Smith, W. J., Modern Optical Engineering, McGraw-Hill, New York, 2000), as result different rays of the beam after refraction intersect optical axis in different points, and the bigger is a ray slope angle the bigger is distance between the paraxial focus F'' and the point of optical axis intersection, that distance is called as longitudinal spherical aberration.

For rays shown in FIG. 1, slope angles $w_I < w_{II}$, correspondingly distances to intersection points are $s_I' < s_{II}'$, and longitudinal aberration $\Delta s_I'$ for the ray with slope angle $w_I$ is smaller than $\Delta s_{II}'$ for the ray with slope angle $w_{II}$. The longitudinal aberration is positive when light beam propagating from air into glass, i.e. into the medium which refractive index is higher than one of the air. The higher is optics NA or deeper is focusing inside the transparent media, the bigger is longitudinal spherical aberration and stronger scattering of light energy.

Aberration has, inevitably, negative influence on the concentration of laser energy in laser processing techniques and reduces physical resolution, contrast and image intensity in optical microscopy (S. Hell et al., "Aberrations in confocal fluorescence microscopy induced by mismatches in refractive index," *Journal of Microscopy* 169(3), 1993, and R. Simmonds et al., "Three dimensional laser microfabrication in diamond using a dual adaptive optics system," *Optics Express* 19(24), 2011) and reduces density of data recording in media in data storage techniques. There appears also an aberration induced shift of effective focus from a nominal focus position (S. Hell et al., "Aberrations in confocal fluorescence microscopy induced by mismatches in refractive index," *Journal of Microscopy* 169(3), 1993)—this is very important in confocal microscopy and other measurement techniques.

Several technical solutions are known to overcome the negative effects from aberration induced by internal focusing in a transparent media.

The German Patent Application DE102010039746A1 to Glasenapp describes a method of using a correcting optical element comprising freeform surfaces and locating before a microscope objective; the correcting optical element introduces in a control manner aberration that compensates the aberration induced by internal focusing in transparent media. Obviously, design of that correcting optical element should be adapted to a particular microscope objective with taking into account features of its optical design; this narrows the range of applicable objectives. An important disadvantage of this method is the use of freeform optical surfaces in which manufacturing is expensive.

Another approach to building objectives optical systems with movable lens groups is described in U.S. Pat. No. 5,940,220 to Suenaga et al. and U.S. Pat. No. 8,705,178 to Fujita. U.S. Pat. No. 6,563,634 to Shimada et al. and U.S. Pat. No. 7,903,528 to Kimura et al. describe solutions with motorized motion of movable lens groups. U.S. Pat. Nos. 8,659,827 and 9,195,041 both to Redford, U.S. Pat. No. 6,721,259 to Yamamoto et al., U.S. Pat. Nos. 7,177,101 and 7,602,561 both to Tanaka et al. present microscope optical systems where aberration compensation is achieved by moving lens groups not in the objective but in other parts of the imaging optical systems.

The approach of using movable lens groups is widely used in imaging using high NA microscope objectives and provides good performance and stable results when operating in particular working planes of a pre-determined range of focusing depths. However technical realizations are rather complicated, provide small range of depths with aberration-free focusing and don't allow compensating the spherical aberration simultaneously in several working planes separated along optical axis required in multi-focus microscopy.

Aberration correction is one of main application tasks for adaptive optics. Optical systems with Spatial Light Modulators (SLM) are described in U.S. Pat. No. 7,065,013 to Yasuda et al., U.S. Pat. No. 7,903,528 to Kimura et al., U.S. Pat. No. 8,526,091 to Ito et al., U.S. Pat. No. 8,659,824 to Kato et al., and paper (H. Itoh et al., "Spherical aberration correction suitable for a wavefront controller," *Optics Express* 17(16), 2009). Various technical solutions based on deformable mirrors are presented in U.S. Pat. No. 8,629,413 to Betzig et al., U.S. Patent Application No. 2015/0185474 to Goldberg et al. and papers (M. Booth et al., "Adaptive aberration correction in a confocal microscope," *PNAS* 99(9), 2002 and R. Simmonds et al., "Three dimensional laser microfabrication in diamond using a dual adaptive optics system," *Optics Express* 19(24), 2011).

Common disadvantages of the technical solutions based on adaptive optics are complexity of realization leading to high costs and low reliability. These methods provide aberration correction for a particular working plane and can't be used for simultaneous correction of aberration, induced by internal focusing, in several working planes that is required in multi-focus microscopy.

U.S. Pat. No. 6,064,529 to McDonald et al. describes the focusing optical system composed from a movable objective and a fixed corrector lens co-operating to compensate negative spherical aberration occurring in the media of optical data storage disks. As discussed above, the longitudinal spherical aberration induced by focusing inside transparent media is positive. Therefore, there are limitations of using this technical solution in tasks of light focusing inside transparent or semi-transparent media with high NA. This method provides aberration correction for a particular working plane and can't be used for simultaneous correction of aberration, induced by high NA internal focusing, in several working planes that is required in multi-focus microscopy.

From the point of view of modern requirements to light focusing in laser material processing and various implementations of optical data storage and microscopy the conventional techniques are not optimal. As such, there is needed an efficient affordable apparatus and system capable to provide light focusing inside transparent or semi-transparent media characterized by numerical aperture up to NA1.3, aberration correction corresponding to diffraction limited focusing, and fulfilling these focusing conditions simultaneously in a single or multiple working planes separated along optical axis.

SUMMARY OF THE INVENTION

A primary objective of the present invention is to provide devices and apparatuses with optical systems for microscopy, laser materials processing and optical data storage techniques providing diffraction limited focusing inside transparent or semi-transparent media comprising at least one movable along optical axis focusing optical system adapted to receive light from a light source and having aplanatic optical design being free from coma aberration and spherical aberration, and at least one movable along optical axis positive meniscus lens increasing numerical aperture of the light beam and locating between the focusing optical system and the said transparent or semi-transparent medium. Advantageously distances between the aplanatic focusing optical system, the meniscus lens and outer surface of the transparent or semi-transparent medium are optimized with criterion of minimized aberration providing diffraction limited internal focusing at given depths inside the said transparent or semi-transparent medium. Advantageously but non-limiting, the residual root-mean-square wave aberration is less than $\lambda/14$, where $\lambda$ is a wavelength of the light beam that according to criteria described in (Born, M. and Wolf, E., Principles of Optics, 7th edn., Cambridge University Press, Cambridge, 1999) corresponds to diffraction limited focusing or imaging. The diffraction limited focusing is required for efficient laser energy concentration in applications of material processing, as well as for high NA imaging in microscopy and optical data storage techniques when physical resolution is defined by wave nature of light only.

A secondary objective of the present invention implies that the surface of the positive meniscus lens facing the said aplanatic focusing optical system is convex, and the surface of the meniscus lens facing the transparent media is concave. The surfaces can be either spherical or aspherical. When applied in microscopy the positive meniscus lens is implemented in form of a multi-lens achromatic or apochromatic optical system comprising lenses made from optical materials having different Abbe numbers, for example cemented or air-spaced doublet or triplet optical systems. The achromatic and apochromatic designs are required in microscopy applications with broad spectral band.

A third objective of the present invention is to provide devices and apparatuses with optical systems providing diffraction limited focusing inside transparent or semi-transparent media wherein the meniscus lens is movable along optical axis independently of other components of the optical system, and its movement is used to compensate aberration induced by internal focusing inside the said media at various depths. Optimum position of the meniscus lens depends on depth of focusing inside the transparent or semi-transparent medium and the medium refractive index, as well as on NA of the light beam; criterion of the optimum position of the meniscus lens is minimized aberration, advantageously but non-limiting, the residual root-mean-square wave aberration is less than $\lambda/14$, where $\lambda$ is a wavelength of the light beam.

A fourth objective of the present invention is to provide devices and apparatuses with optical systems providing diffraction limited focusing inside transparent or semi-transparent media wherein the aplanatic focusing optical system comprises at least one objective lens. Advantageously, the aplanatic focusing optical system is movable along optical axis independently of other components of the optical system, and its movement is used to focus light at various depths in media and to compensate aberration induced by internal focusing inside transparent or semi-transparent media at various depths. Optimum position of the aplanatic focusing optical system with respect to other components of the optical system depends on depth of focusing inside the transparent or semi-transparent medium and the medium refractive index, as well as on NA of the light beam; criterion of the optimum position of the meniscus lens is minimized aberration, and advantageously but non-limiting, the residual root-mean-square wave aberration is less than $\lambda/14$, where $\lambda$ is a wavelength of the light beam.

A fifth objective of the present invention implies that the aplanatic focusing optical system has achromatic or apochromatic optical design that is required in microscopy applications with broad spectral band.

A sixth objective of the present invention is to provide devices and apparatuses with optical systems providing diffraction limited focusing inside transparent or semi-transparent media wherein the movable focusing optical system and the movable meniscus lens are moved using gear systems and motors controlled by electronic controllers. Motorizing of movement of the optical system components makes its operation easier and provides repeatability of the system settings.

A seventh objective of the present invention is to provide devices and apparatuses with optical systems providing diffraction limited focusing inside transparent or semi-transparent media wherein the medium is liquid and is covered by a cover slide from glass or another refractive transparent material. To increase the optical system numerical aperture the space between the meniscus lens and the cover slide is filled out by the immersion liquid, advantageously but non-limiting, by water or oil. The distances between the aplanatic focusing optical system, the meniscus lens and outer surface of the said cover slide are optimized to compensate aberration induced by internal focusing inside the transparent or semi-transparent medium, thus the diffraction limited internal focusing is provided. This feature is important in biological microscopy researches.

Embodiments of the apparatus, devices, systems and methods for realizing beam shaping of focused beams are described.

One skilled in the relevant art will recognize, however, that the invention can be practiced without one or more of the specific details, or with other methods, components, materials, etc. In other words, well-known structures, materials, or operations are not shown or described in detail to avoid obscuring aspects of the invention.

Further objects and advantages of this invention will be apparent from the following detailed description of the presently preferred embodiments which are illustrated schematically in the accompanying drawings.

BRIEF DESCRIPTION OF THE DRAWINGS

The invention is illustrated, without limitation, by the accompanying drawings, which are briefly described below.

FIG. 4 presents results of calculations of residual wave aberrations at different focusing depths in optical system according to one non-limiting embodiment of the present invention described in FIG. 3, TABLE 1.

FIG. 5 presents results of calculations of residual wave aberrations at different focusing depths in optical system with expanded range of focusing depths according to another non-limiting embodiment of the present invention described in FIG. 3, TABLE 2.

DETAILED DESCRIPTION OF THE INVENTION

Figure 1:
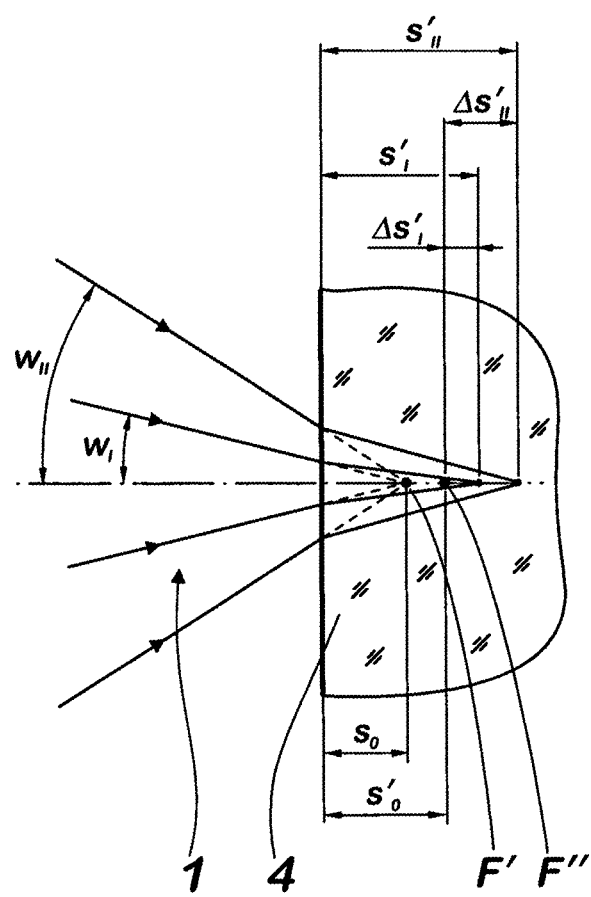
FIG. 1 demonstrates the effects of inducing positive longitudinal spherical aberration when a light beam propagates from air into a transparent medium with higher refractive index and is focused inside that transparent medium.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Figures and the various embodiments used to describe the principles of the present invention are by way of illustration and should not be construed in any way to limit the scope of the invention. Those skilled in the art will understand that the principles of the present invention may be implemented in a variety of devices of microscopy, optical data storage and laser material processing.

The following list of reference numerals and symbols is used in the description and the drawings to identify components:

1 light beam, for non-limiting example a laser beam
2 focusing optical system, for non-limiting example objective
3a meniscus lens
3b cemented doublet meniscus lens
3c air-spaced doublet optical system, with fixed air gap between lenses
4 transparent medium, for non-limiting example glass, sapphire
5 cover slide
6 liquid or another transparent medium under microscopy investigation
7 immersion, for non-limiting example water, oil
8a, 8b gear systems
9a, 9b motors
10a, 10b electronic controllers
F paraxial focus of focusing optical systems 2
F' intermediate focus after meniscus lens 3a
F" focus inside transparent medium 4
$n_1$ refractive index of meniscus lens 3a,
$n_3$ refractive index of transparent medium 4,
C point of a sample under investigation in liquid medium 7

NA numerical aperture of a light beam.

The meanings of other symbols are given in text.

According to the present invention there are realized various optical systems for various types of optical data storage, microscopy and laser material processing capable to provide light focusing inside transparent or semi-transparent media characterized by high NA, aberration correction corresponding to diffraction limited focusing, fulfilling these focusing conditions simultaneously in a single or multiple working planes separated along optical axis.

The optical systems according to present invention comprise two basic parts: aplanatic focusing optical system and meniscus lens. The basic approach of building optical systems according to present invention is illustrated in FIG. 2.

The aplanatic focusing optical system 2 is implemented in form of an objective, which focus F is locating at distance $s_1$ from the convex surface of meniscus lens 3a. For purpose of clear description of operation principle there is considered focusing of light beam 1 inside transparent medium 4, which has flat optical surface,—this is a typical physical approach in applications of material processing and data recording in systems of optical data storage. Physical resolution of imaging optical systems in microscopy and reading-out systems in optical data storage techniques is defined by properties of light focusing by optical systems, therefore considering of just light focusing for characterization of optics quality is justified.

Advantageously, the meniscus lens 3a has an optical design close to one of a positive aplanatic lens, which convex surface is aplanatic for the convergent incident beam and the concave surface is concentric to the beam refracted by the said aplanatic convex surface; important feature of the aplanatic lens is fulfillment of the sine condition (Born, M. and Wolf, E., Principles of Optics, 7th edn., Cambridge University Press, Cambridge, 1999, and Smith, W. J., Modern Optical Engineering, McGraw-Hill, New York, 2000) which can be written for variables in FIG. 2 and FIG. 3 as $$n_1 \cdot \sin w = \sin w'. \quad (1)$$

Figure 2:
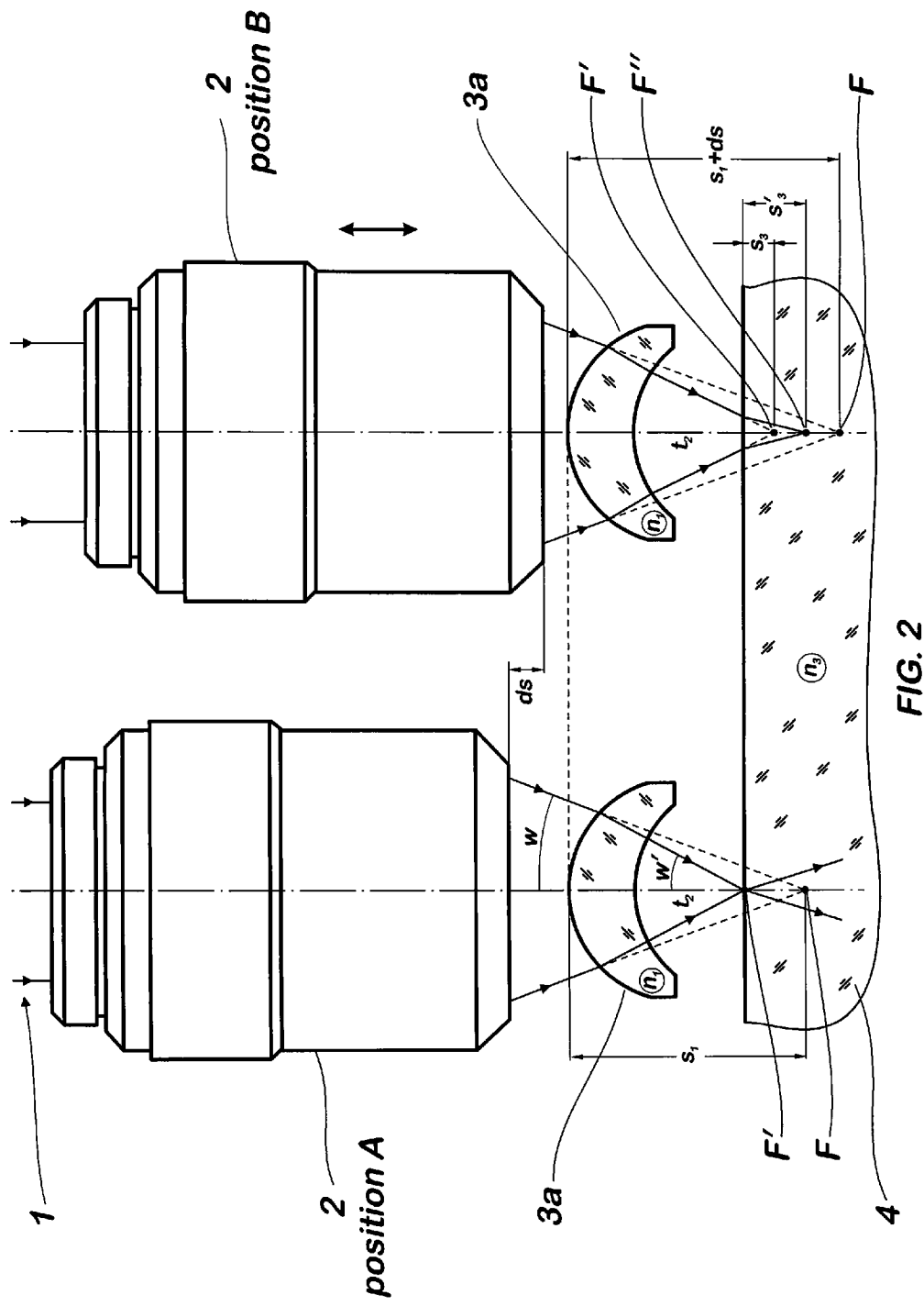
FIG. 2 is a schematic diagram of diffraction limited focusing in transparent media using the optical system, according to one non-limiting embodiment of the present invention, in the form of a movable objective and a meniscus lens.

Position A of the objective 2 in FIG. 2 corresponds to focusing of a beam after the meniscus lens 3a, focus F', on flat surface of the transparent medium 4. According to the present invention the light focusing inside the medium 4 is realized, advantageously, through shifting the objective 2 along optical axis at distance ds in position B; then the intermediate light focus F' after the meniscus lens is located at depth $s_3$ inside the medium 4, and the final focus F''' locates at depth $s'_3$.

Figure 3:
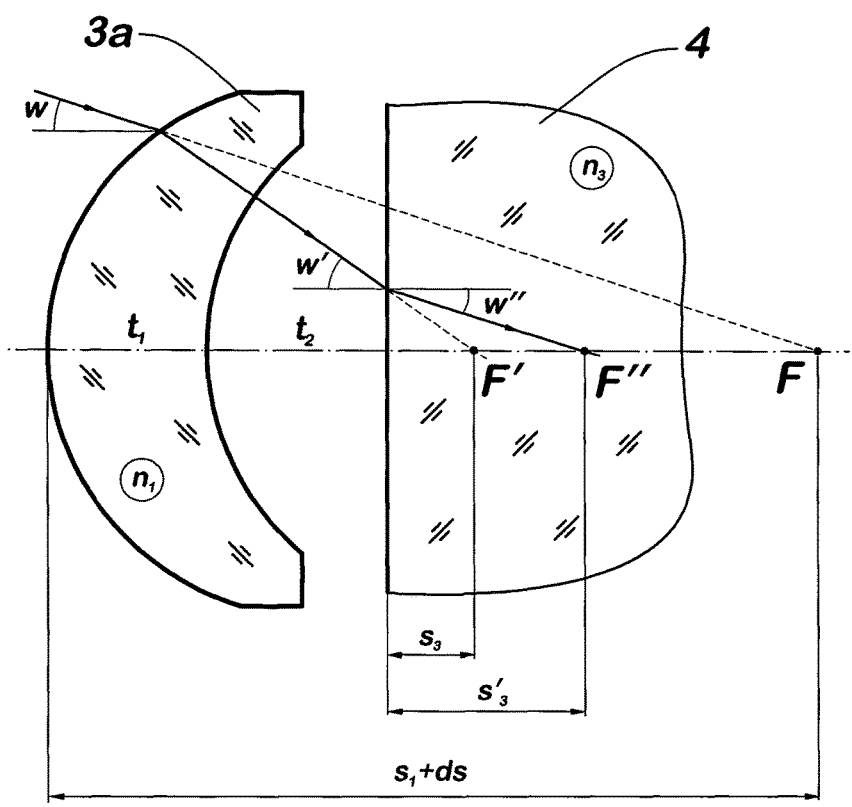
FIG. 3 is a schematic layout of a meniscus lens and transparent medium according to one non-limiting embodiment of the present invention with ray-trace.

By refraction of light on the flat surface of the medium 4, FIG. 3, the slope angles w' and w" of, correspondingly, incident and refracted rays obey the Snell's law $$\sin w' = n_3 \cdot \sin w''. \quad (2)$$

There exists evident similarity of Eqs. (1) and (2). Detailed mathematical analysis of aberration functions in optical system presented in FIG. 3 shows that in case of equality of refractive indexes $n_1$ of material of the meniscus lens 3a and $n_3$ of the medium 4 there is equality of slope angles $$w = w'' \quad (3)$$

and the spherical aberrations induced by optical surfaces compensate each other and there is provided diffraction limited focusing with arbitrary NA inside the said medium 4 at the depths which are order of magnitude smaller than focal length of the meniscus lens 3a; the value of de-focusing shift ds of the objective 2 is defined by the focusing depth $s'_3$ according to equation $$ds = n_3 \cdot s'_3. \quad (4)$$

To optimize performance of the optical systems according to present invention, for example to expand the range of focusing depths inside media 4 the ds value can deviate from the theoretical one defined by the Eq. (4), advantageously, that deviation in real optical systems doesn't exceed ±10%, the deviation values are practically defined by design optimization using optical design software for particular optical material of the meniscus lens 3a, media 4 and the focusing depth $s'_3$.

The present invention can be implemented in form of various optical systems; several embodiments will now be described.

A non-limiting Embodiment 1 of the optical system according to the FIG. 3 is described in TABLE 1; this system provides diffraction limited focusing with NA 0.8.

TABLE 1

Embodiment 1, design data of optimized optical system

| # | r | t | n |
|---|---|---|---|
|   |   | $s_1 = 24$ | 1 |
| 1 | 8 | 4 | 2 |
| 2 | 8 | 7.996 | 1 |
| 3 | Infinity | $s'_3 = 0 \ldots 0.4$ | 2 |

The meniscus lens 3a presents a positive aplanatic lens with spherical optical surfaces, value of the air gap $t_2$ to the flat surface of the medium 4 is optimized from the point of view of minimized residual wave aberration in wide range of focusing depths $S'_3 = 0 \ldots 0.4$ mm. Results of calculations of optimum de-focusing shift ds of the objective 2, residual wave aberration and root-mean-square (RMS) wavefront deformation for pre-determined focusing depths $S'_3$ are presented in tabular form in FIG. 4. Since the main aim of the present invention is providing optical systems for diffraction limited focusing, it is convenient to evaluate the optical system performance using the Maréchal criterion establishing that the image degradation due to the presence of aberrations is negligible when the RMS wavefront deformation of less than $\lambda/14$, where $\lambda$ is a wavelength of light 1, then the physical resolution doesn't depend on geometrical aberrations and is limited by diffraction effects only (Born, M. and Wolf, E., Principles of Optics, 7th edn., Cambridge University Press, Cambridge, 1999). The data presented in FIG. 4 confirm that the optical system of the Embodiment 1 provides diffraction limited focusing with NA0.8 at wide range of depths up to 0.4 mm, which covers practical needs in majority of applications in laser micromachining, recording and reading out of data in techniques of optical data storage, and in various types of microscopy.

The Embodiment 1 of the optical system according to the present invention implies that the air gap $t_2$ between the concave spherical surface of the meniscus lens 3a and the flat surface of the medium 4 is constant while focusing at different depths inside the said medium 4. There are other embodiments of optical systems according to the present invention which presume variation of that air gap $t_2$ in order to expand the range of depths where high NA diffraction limited focusing is provided, this approach is realized in a non-limiting Embodiment 2 of the present invention which is described in TABLE 2. Results of calculations of optimum de-focusing shift ds, residual wave aberration and RMS wavefront deformation for various focusing depths S'3 are presented in tabular form in FIG. 5.

TABLE 2

Embodiment 2, design data of the optical system optimized for wider range of focusing depths

| # | r | t | Material | $n_{1030}$ |
|---|---|---|---|---|
| 1 | 8 | $s_1 = 24$<br>4.5 | Glass S-LAH79<br>(Ohara) | 1<br>1.968134 |
| 2 | 8 | $t_2$ = variable | | 1 |
| 3 | Infinity | $s'_3 = 0 \ldots 1.0$ | $Al_2O_3$ | 1.755111 |

The optical system of the Embodiment 2 realizes focusing of light beam with wavelength 1030 nm inside sapphire using meniscus lens 3a made from high refractive index optical glass S-LAH79 (Ohara), the de-focusing shift ds and the air gap $t_2$ vary according to a focusing depths, which range spans from 0 to 1 mm; the depths range is more than twice larger than one in the Embodiment 1 and meets requirements of majority of modern applications in laser micromachining, optical data storage, and various types of microscopy. The RMS wave aberration doesn't exceed the value $\lambda/14$ over whole range of focusing depths; thus the condition of Maréchal criterion of diffraction limited focusing with NA0.8 is fulfilled for whole working range of depths. Values of the RMS wave aberration in the Embodiment 2 are substantially less than $\lambda/14$, therefore it is possible to improve specifications of the optical system by further refining the design, for example, either to expand the range of depths or increase NA of diffraction limited focusing.

Important feature of the Embodiment 2 is mismatch of refractive indexes of the meniscus lens 3a and the transparent medium 4. Even then design optimization by slight deviation of design parameters of the meniscus lens 3a from ones of theoretical design of aplanatic lens makes it is possible building the optical system providing diffraction limited focusing at wide range of depths.

Optical designs of meniscus lenses according to the present invention are very close to design of positive aplanatic lens, this guarantees correction of not only on-axis spherical but also off-axis coma and astigmatism aberrations, that, in turn, provides low sensitivity to misalignment and reliable operation in certain angular field. Another important property of the meniscus lens 3a is increasing NA of the focused beam without inducing on-axis and off-axis aberrations; therefore the focusing optical system 2 can be implemented with lower NA and, hence, with less complicated optical design.

The condition of the high NA diffraction limited focusing using optical systems according to the present invention is fulfilled for all focusing planes of the pre-determined range of depths inside the transparent media 4 when an optimum value of the de-focusing shift ds of the focusing optical system 2 for a particular focusing plane is chosen. Therefore, if the focusing optical system 2 is implemented as a multi-focus objective the conditions of diffraction limited focusing are fulfilled simultaneously for all multiple foci. The multiple foci are created due to applying in optical design optical elements splitting the light beam to separate parts which are focused in separate foci. According to one non-limiting optical approach the said optical elements are diffractive optical elements splitting the beam energy in different diffraction orders. One more non-limiting optical approach is using optical elements, which parts of clear aperture have different optical power, thus providing focusing in different foci along optical axis. Multiple focuses allow increasing productivity of laser material processing techniques and improving processing quality because of even distributing laser energy along optical axis. Another application is multi focal microscopy providing simultaneous imaging in several separate layers.

Various methods of modern microscopy presume operation with broad spectral band light sources, as a non-limiting example visible light, or various combinations of laser sources with different wavelengths, which is typical for modern fluorescence life sciences techniques. To provide workable solutions for modern microscopy the components of optical systems according to the present invention are implemented as achromatic or apochromatic ones. As non-limiting examples the focusing optical systems in form of multi-lens objectives 2 in FIG. 6 and FIG. 7 have achromatic or apochromatic optical designs in particular spectral bands, as non-limiting example, in visible spectrum.

Figure 6:
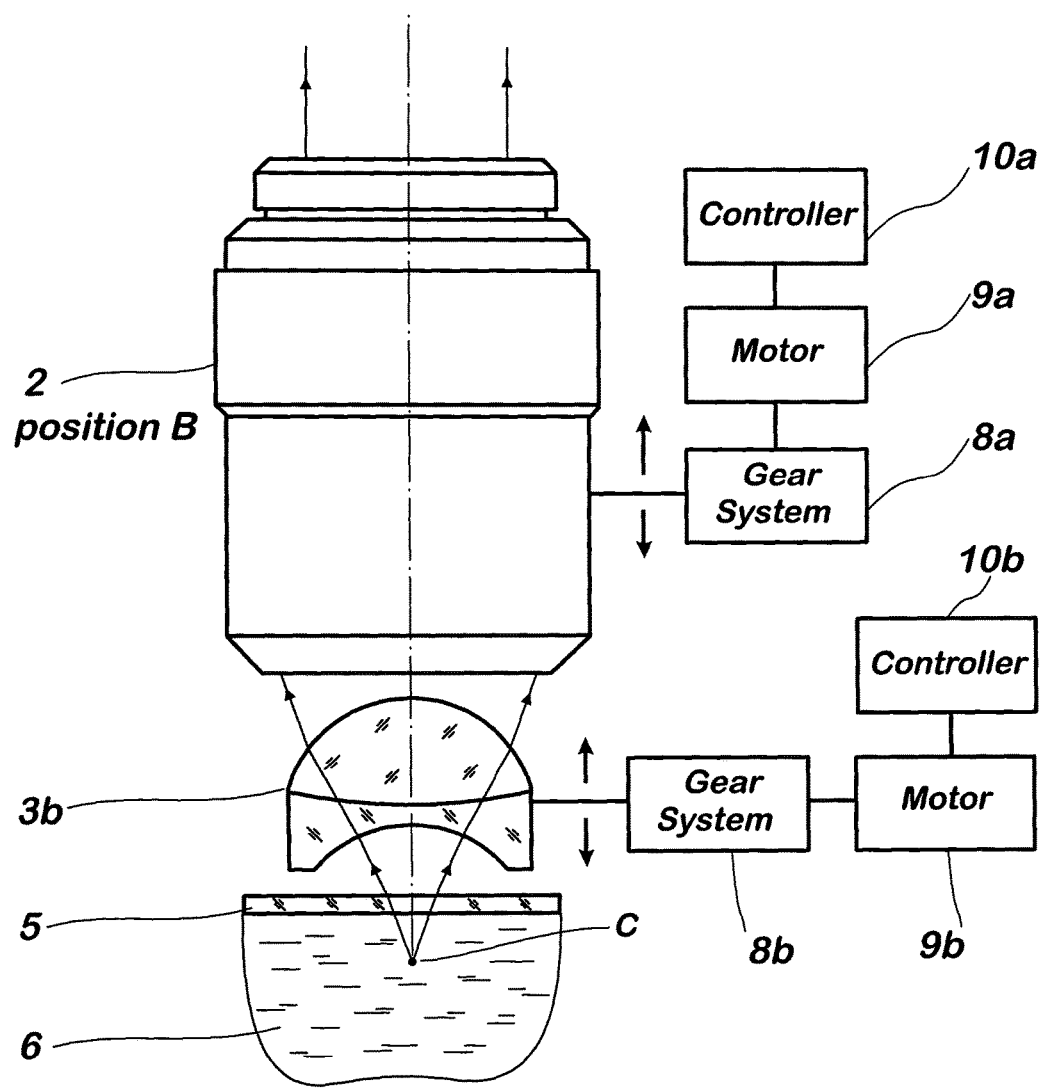
FIG. 6 is a schematic diagram of a diffraction limited high NA microscopy objective optics, according to one non-limiting embodiment of the present invention, in the form of an objective and a cemented doublet meniscus lens being applied for microscopy investigation in transparent liquid or another media; both the objective and cemented doublet meniscus lens are separately movable along optical axis.

According to the present invention achromatic design of the meniscus lens presumes implementation in form of an optical system composed from at least two lenses made from different optical materials having different Abbe numbers: FIG. 6 presents the embodiment as a cemented doublet 3b, and the embodiment as an air-spaced doublet 3c is presented in FIG. 7. Calculations of design parameters of lenses of achromatic optical systems can be done using well-known methods, which sufficient description is presented for example in book (Smith, W. J., Modern Optical Engineering, McGraw-Hill, New York, 2000).

Improving of optics performance in broad spectrum requires applying apochromatic design presuming implementation of the meniscus in form of an optical system composed from at least three lenses made from different optical materials having different Abbe numbers. Embodiments of the apochromatic meniscus can be in form of a cemented triplet, or an air-spaced triplet, or a triplet combining a cemented doublet and air-spaced lens. The common feature of all achromatic and apochromatic designs of the meniscus lenses 3a or 3b or 3c is that the surface facing the focusing optical system is convex, and the last surface facing the outer surface of the transparent media 4 or a cover slide 5 is concave.

Various developments in modern microscopy are aimed at improvement of high resolution imaging in life sciences investigations presuming analysis of samples C in liquid media 6, FIG. 6; the established approach is using a cover slide 5 with polished flat surfaces. Thus, the sample space comprises several flat optical surfaces separating the media with different refractive indexes, therefore high NA imaging requires compensation of aberration induced by all said surfaces. The optical systems according to the present invention presume separate moving of the focusing optical system 2 and the meniscus lenses 3a or 3b or 3c with respect to each other and with respect to the transparent media 4 or the cover slide 5. Optimizing positions of the focusing optical system 2 and the meniscus lenses 3a or 3b or 3c allow minimizing the aberrations of entire optical system, including the cover slide 5, and providing diffraction limited focusing at different depths in the media 6. The aberrations, appearing due to mismatch of refractive indexes of the meniscus lens 3a or 3b or 3c, the cover slide 5 and the media 4 or 6, are compensated by tuning the position of movable components of the optical system according to the present invention.

Figure 7:
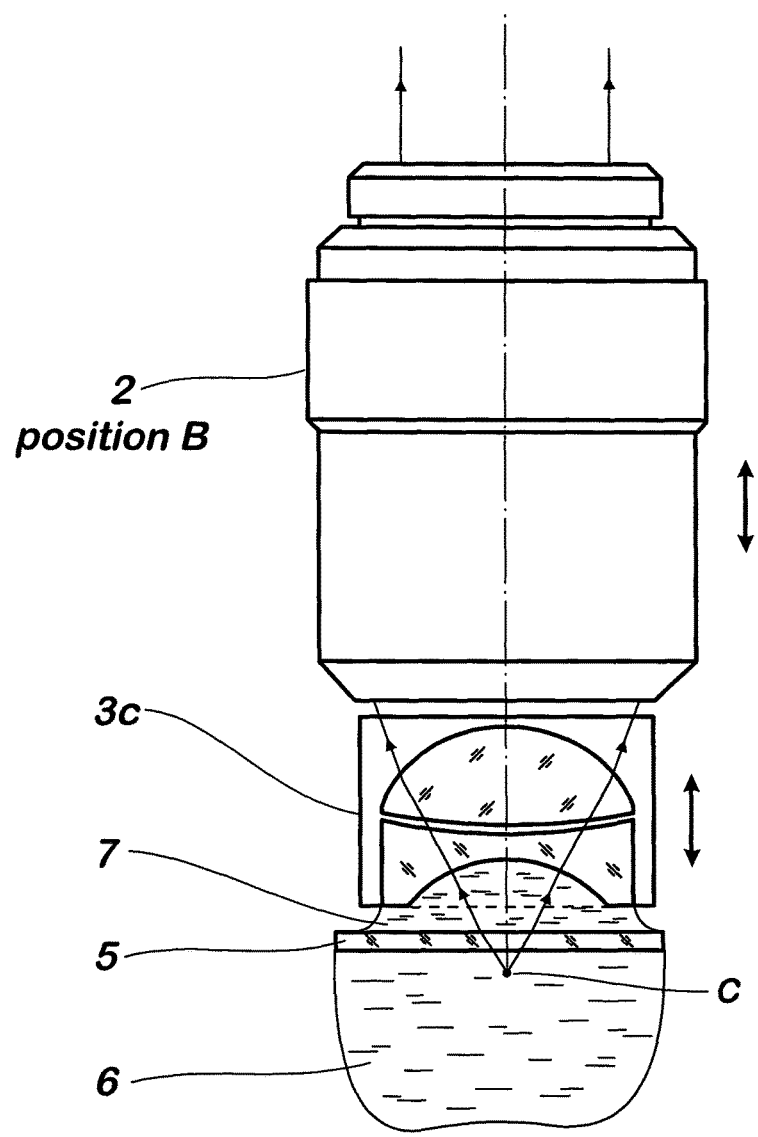
FIG. 7 is a schematic diagram of diffraction limited high NA microscopy objective optics, according to one non-limiting embodiment of the present invention, in form of an objective and an air-spaced doublet optical system being applied for microscopy investigation in transparent liquid or another media using liquid immersion; both the said objective and air-spaced doublet optical system are separately movable along optical axis.

Imaging resolution in microscopy is defined by the NA of the optical system in the space of a sample to be investigated. To reduce the spot size of focused beam and, hence, increase the physical resolution of a microscope it is suggested to use immersion in space between the meniscus lens 3a or 3b or 3c and the cover slide 5 or medium 4. The non-limiting embodiment of the optical system according to the present invention realizing this approach is shown in FIG. 7: the meniscus lens 3c is implemented as air-spaced achromatic doublet, immersion liquid 7 is provided in space between the said meniscus lens 3c and the cover slide 5. Then the NA of the entire optical system is increased proportionally to refractive index of the immersion liquid 7, as non-limiting examples water, oil, then it is possible to reach in practical designs NA1.3 required in modern applications of high resolution microscopy.

Practical use of various implementations of the optical systems according to the present invention in microscopy, optical data storage or laser material processing presumes focusing at different depths inside transparent or semi-transparent media. Frequent change of working depth values requires frequent moving of the focusing optical systems 2 as well as the meniscus lens 3a or 3b or 3c along optical axis in positions corresponding to diffraction limited focusing inside transparent media 4 or 6. Some embodiments of the optical systems according to the present invention presume manual moving of the said movable components.

To automatize operation of the optical systems and make them easier to use in practice other embodiments of the present invention presume motorizing of components motion. One non-limiting embodiment of a motorized system is presented in FIG. 6 where independent movements of the aplanatic focusing optical system 2 and meniscus lens 3b are realized using gear systems 8a and 8b, motors 9a and 9b being controlled using electronic controllers 10a and 10b, advantageously using computers. State-of-the-art mechatronics components provide high level of flexibility of building suitable solutions for high precision and synchronic motion of movable components.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An optical system for diffraction limited focusing inside a transparent or semi-transparent media comprising:
   at least one focusing optical system movable along an optical axis adapted to receive light from a light source and having aplanatic optical design being free from coma aberration and spherical aberration, and
   at least one positive meniscus lens movable along the optical axis for increasing numerical aperture of a light beam and located between the focusing optical system and the transparent or the semi-transparent media.

2. The optical system according to claim 1, wherein distances between an aplanatic focusing optical system, the meniscus lens and an outer surface of the said transparent or semi-transparent medium are optimized with criterion of minimized aberration providing diffraction limited focusing at a given depth inside the transparent or semi-transparent medium.

3. The optical system according to claim 1, wherein a surface of the meniscus lens facing the focusing optical system is convex, and another surface of the meniscus lens facing the transparent or semi-transparent medium is concave.

4. The optical system according to claim 1, wherein all optical surfaces of the meniscus lens are spherical.

5. The optical system according to claim 1, wherein at least one of all optical surfaces of the meniscus lens is aspherical.

6. The optical system according to claim 1, wherein the meniscus lens is implemented in form of a positive multi-lens achromatic or apochromatic optical system comprising lenses made from optical materials having different Abbe numbers.

7. The optical system according to claim 1, wherein the meniscus lens is used as a cemented doublet.

8. The optical system according to claim 1, wherein the meniscus lens is used as an air-spaced doublet optical system.

9. The optical system according to claim 1, wherein the meniscus lens is used as an air-spaced triplet optical system.

10. The optical system according to claim 1, wherein the meniscus lens is movable along the optical axis independently of other components of the optical system, and movement of the meniscus lens is used to compensate aberration induced by focusing at various depths inside the transparent or the semi-transparent media.

11. The optical system according to claim 6, wherein an aplanatic focusing optical system comprises at least one objective lens.

12. The optical system according to claim 11, wherein
   the focusing optical system is movable along the optical axis independently of other components of the optical system, and its movement is used to provide light focusing at various depths and to compensate aberration induced by focusing at the various depths inside the transparent or the semi-transparent media.

13. The optical system according to claim 1, wherein the focusing optical system is achromatic or apochromatic.

14. The optical system according to claim 1, wherein movable components of the optical system are moved using gear systems and motors controlled by electronic controllers.

15. The optical system according to claim 10, wherein movable components of the optical system are moved using gear systems and motors controlled by electronic controllers.

16. The optical system according to claim 12, wherein movable components of the optical system are moved using gear systems and motors controlled by electronic controllers.

17. The optical system according to claim 1, wherein the transparent or semi-transparent medium is covered by a cover slide from glass or another refractive transparent material.

18. The optical system according to claim 17, wherein space between a surface of the meniscus lens and the cover slide is filled out by an immersion liquid.

19. An optical device for diffraction limited focusing inside a transparent or semi-transparent media comprising:
   at least one focusing optical system movable along an optical axis adapted to receive light from a light source and having aplanatic optical design being free from coma aberration and spherical aberration, and
   at least one positive meniscus lens movable along the optical axis for increasing numerical aperture of a light beam and located between the focusing optical device and the transparent or the semi-transparent media.

* * * * *